United States Patent [19]

Oetiker

[11] Patent Number: 5,096,235
[45] Date of Patent: Mar. 17, 1992

[54] RAPID COUPLING ARRANGEMENT

[76] Inventor: Hans Oetiker, Oberdorfstrasse 21, CH-8812 Horgen, Switzerland

[21] Appl. No.: 553,635

[22] Filed: Jul. 18, 1990

[51] Int. Cl.⁵ ............................................. F16L 37/08
[52] U.S. Cl. ..................................... 285/308; 285/340; 285/921
[58] Field of Search ............. 285/319, 921, 340, 308, 285/317, 382, 192, 211

[56] References Cited

U.S. PATENT DOCUMENTS

| | | | |
|---|---|---|---|
| 2,570,909 | 10/1951 | Benson et al. | 285/192 X |
| 3,374,014 | 3/1968 | Kull et al. | 285/382 X |
| 4,593,943 | 6/1986 | Hama et al. | 285/340 X |
| 4,600,221 | 7/1986 | Bimba | 285/319 X |
| 4,630,848 | 12/1986 | Twist et al. | 285/340 X |
| 4,749,214 | 6/1988 | Hoskins et al. | 285/319 X |
| 4,946,205 | 8/1990 | Washizu | 285/319 |
| 4,948,180 | 8/1990 | Usui et al. | 285/319 X |
| 4,979,765 | 12/1990 | Bartholomew | 285/319 X |

FOREIGN PATENT DOCUMENTS 2307154 8/1974 Fed. Rep. of Germany ...... 285/319

Primary Examiner—Dave W. Arola
Assistant Examiner—Heather Chun
Attorney, Agent, or Firm—Paul M. Craig, Jr.

[57] ABSTRACT

A rapid coupling arrangement, especially for engine blocks of internal combustion engines in which all bores in the engine block are non-threaded bores which can be made in a single operation. The coupling arrangement further includes a bushing member which assists in retaining a spring member that can lock a tubular connecting member in place after its insertion into the bushing and engine block.

21 Claims, 3 Drawing Sheets

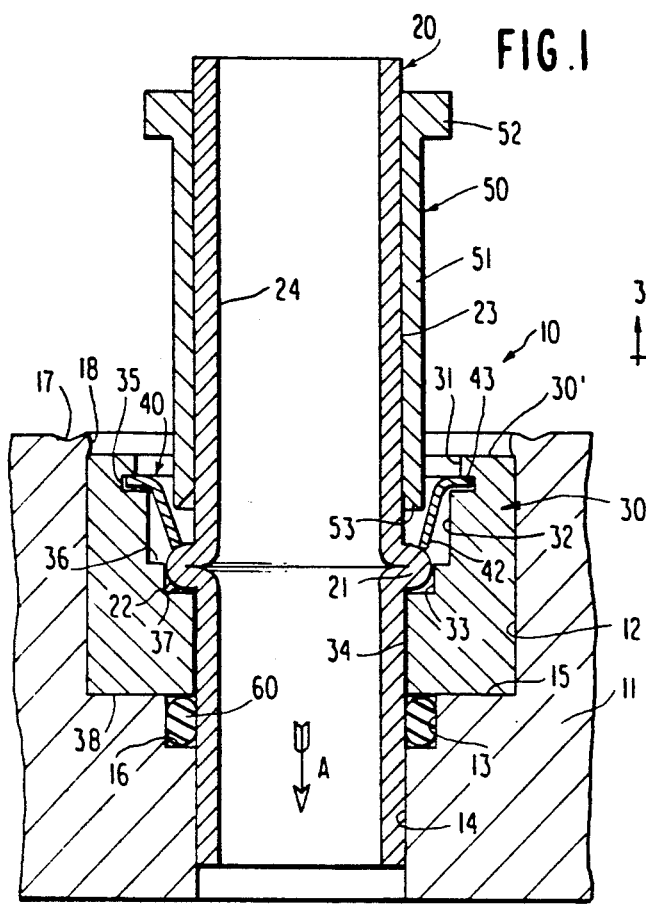
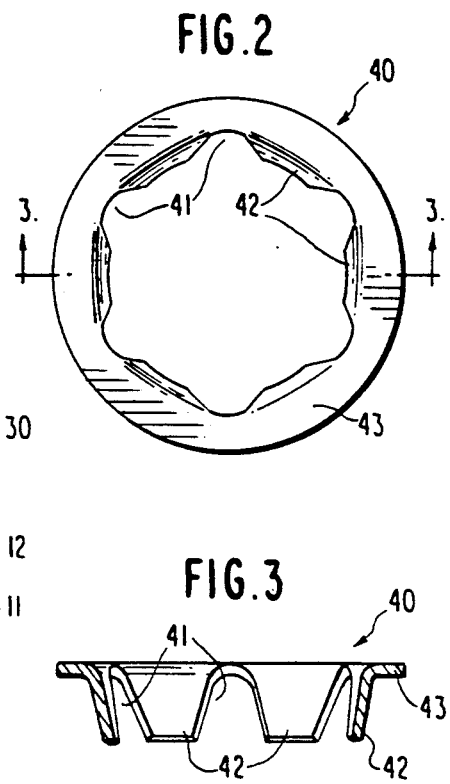
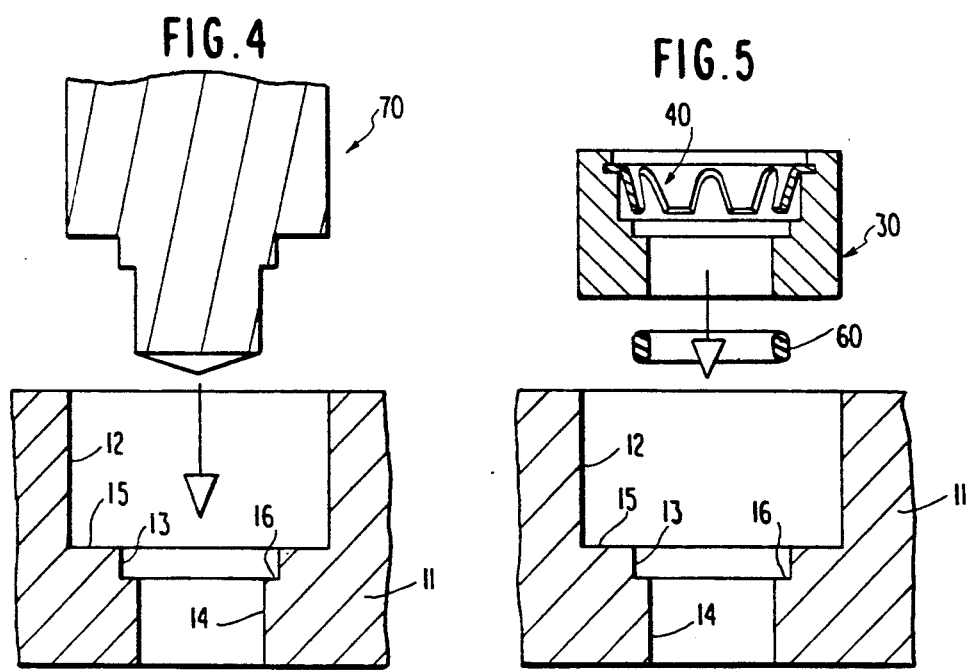

RAPID COUPLING ARRANGEMENT

FIELD OF INVENTION

The present invention relates to a rapid coupling arrangement, and more particularly to a rapid coupling arrangement for establishing fluid-tight connections with the interior of engine blocks in internal combustion engines.

BACKGROUND OF THE INVENTION

At present, connections between the inside of the engine block and external connecting lines are usually made by means of threaded bores in the engine block into which are screwed connecting members, such as connecting pipe stubs, nipples and the like. These prior art connections are both time-consuming and costly to manufacture as they require machining operations to cut threads into the internally threaded bores in the engine block and externally into the connecting members to be screwed into the threaded bores. Additionally, these threaded connections must be reliably sealed by appropriate sealing arrangements which frequently require additional machining. The connection of the threaded connecting members, such as pipes or nipples which are screwed into the threaded bores of the engine block is time-consuming, particularly as this must be done frequently with a predetermined torque to assure a reliable seal.

The prior art coupling arrangements by the use of threaded parts and threaded bores is also disadvantageous in connection with present-day manufacturing techniques as used in the automotive industry relying ever more heavily on robots because it limits the applicability and/or complicates the use of robots for these connections.

SUMMARY OF THE INVENTION

The rapid coupling arrangement in accordance with the present invention obviates the aforementioned shortcomings and drawbacks encountered with the presently used coupling arrangements and at the same time permits a time-saving and more economical production.

The coupling arrangement in accordance with the present invention can be manufactured by means of a stepped boring tool which, in a single operation, is able to provide the necessary non-threaded stepped bores in the engine block. No need exists any longer for any time-consuming operations to cut-in threads, nor is the use of a torque key necessary any longer to screw the connecting member into the threaded bore. Furthermore, only a single seal is required in the rapid coupling arrangement in accordance with the present invention, as contrasted by the need of two seals as required heretofore in many commercial applications. The rapid coupling arrangement in accordance with the present invention is thereby made in such a manner that the various component parts thereof can be secured reliably with a single impact whereby the material displacement, which achieved the secure assembly of the parts, can be milled away again in a simple manner if disassembly is subsequently desired or required.

The type of assembly of the rapid coupling in accordance with the present invention additionally assures a vibration-free assembly because no threads are present any longer. Furthermore, the tedious insertion of an 0-ring into an annular groove can be dispensed with as had been necessary in known commercially used coupling arrangements. Finally, a considerable saving in weight can be achieved which is of significance in present-day automobile design.

The rapid coupling arrangement according to the present invention, in addition to non-threaded bores in the engine block, includes a bushing member devoid of any threaded surfaces and held in place within the engine bore by material displacement and a locking device held in place within or on the bushing by particularly simple means. Again, no threaded bores or threaded parts are necessary for fixing the locking device. In one embodiment according to the present invention, the locking device includes a washer-type spring member having finger-like spring members extending inwardly in the insertion direction, whereby finger-like spring members are integral with the remaining annular part of the washer-type spring member. The latter is thereby retained within an annular recess in the bushing or is held in position on a stepped bore portion of the bushing by a retaining ring, itself secured in position within the bushing by material displacement. In another embodiment according to the present invention the locking device includes a number of slidable locking members slidable within bores extending inwardly toward the axis in a direction opposite the insertion direction whereby the preferably cylindrical locking members are urged inwardly by an elastic ring or spring wire. The finger-like spring members as also the slidable locking members thereby move inwardly after passage of an annular bead on the connecting member so that the connecting member is held securely in the inserted position when the finger-like spring member or slidable locking members snap-in behind the annular bead under their own spring stress, respectively, under the spring stress of the elastic ring or spring bore. In still another embodiment of the present invention, the locking device includes a simple spring ring adapted to engage within an annular recess in the connecting member and cooperating with internal surfaces in the bushing and the connecting member.

My prior Swiss Patent 668,630 already discloses a rapid coupling arrangement in which detent elements are adapted to engage behind an annular bead or in an annular groove of the connecting member to retain the coupling member. However, in all embodiments disclosed in this patent, a threaded bushing is required to accommodate an annular seal whereby additional sealing means would become necessary to prevent leakage through the threads if used for purposes similar to those of the present invention. Furthermore, the arrangement disclosed in this patent would not be suitable for use in mass production, particularly in the automotive industry where a minimum of operations is desirable in the production of the completed engine blocks.

BRIEF DESCRIPTION OF THE DRAWINGS

These and other objects, features and advantages of the present invention will become more apparent from the following description when taken in connection with the accompanying drawing which shows, for purposes of illustration only, several embodiments in accordance with the present invention, and wherein:

FIG. 1 is a cross-sectional view through a rapid coupling arrangement in accordance with the present invention;

FIG. 2 is a top plan view on the washer-type spring member used in the embodiment of FIG. 1;

FIG. 3 is a transverse cross-sectional view through the axis of the washer-type spring member of FIG. 2 taken along line III—III of FIG. 2;

FIG. 4 is a cross-sectional view illustrating schematically the manner of manufacture in a single operation of the required stepped bore in the engine block by the use of a stepped boring tool;

FIG. 5 is a cross-sectional view schematically illustrating the assembly of the rapid coupling arrangement in accordance with the present invention within the stepped bore of an engine block;

DETAILED DESCRIPTION OF THE DRAWINGS

Figure 6:
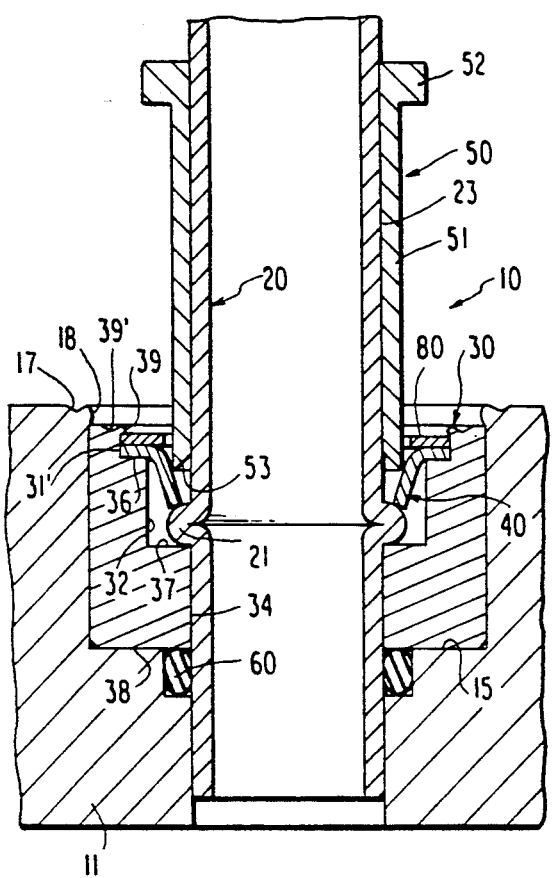
FIG. 6 is a cross-sectional view, similar to FIG. 1, of a modified embodiment of a rapid coupling arrangement in accordance with the present invention.

Referring now to the drawing wherein like reference numerals are used throughout the various views to designate like parts, and more particularly to FIGS. 1-3, reference numeral 10 generally designates the rapid coupling arrangement in accordance with the present invention for a relatively fixed part 11, and in particular for an engine block of an internal combustion engine, the interior of which is to be connected in a fluid-tight manner with the outside by way of a tubular connecting member generally designated by reference numeral 20, for example, by a pipe stub, nipple or the like. As can be seen in particular from FIGS. 1 and 4, the part 11 is provided with three stepped bore portions 12, 13 and 14 of decreasing internal diametric dimension, as viewed in the downward direction, to form steps between the bottom surface 15 of the first bore portion 12 and the second bore portion 13 and between the bottom surface 16 and the third bore portion 14. The part 11, for example, the engine block made of any appropriate material, for example, aluminum, light alloy or cast iron, can be provided with the illustrated bore configuration in a single operation by the use of a stepped boring tool 70 shown schematically in FIG. 4. The connecting member 20 which may be, for example, a connecting pipe provided at its outer end (not shown) with a nipple, an externally threaded part or any other suitable fastening means, includes a cold-deformed annular bead 21 which is formed by conventional means applied inside of the connecting member to radially outwardly displace material from the otherwise tubular connecting member 20. The annular bead 21 is provided with appropriately configured rounded-off external surfaces 22. As to the rest, the connecting member 20 has an essentially constant external diameter 23 and an essentially constant internal diameter 24, whereby the external diameter 23 is matched to the bore portion 14 in such a manner as to permit slidable insertion of the connecting member 20 in the insertion direction indicated in FIG. 1 by arrow A. A bushing member generally designated by reference numeral 30 is provided with four bore portions 31, 32, 33 and 34 of decreasing diameter in the insertion direction A whereby an annular groove 35 is additionally formed in the area of the lower end of the bore portion 31 to accommodate an annular washer-type locking spring member generally designated by reference numeral 40 as will be described more fully hereinafter. A step is again formed between the bottom surface 36 of the bore portion 32 and the bore portion 33 as well as between the bottom surface 37 and the bore portion 34. The lower surface 38 of the bushing thereby rests on the bottom surface 15 of the part 11. The annular washer-type locking spring member 40 includes obliquely downwardly, inwardly protruding finger-like spring members 42 formed by cutouts 41 in the washer whereby the remaining rim portion 43 engages in the annular groove 35. The cutouts 41 are thereby made in such a manner that the remaining annular rim portion 43 adapted to fit into the annular recess or groove 35 is provided circumferentially of the washer-type spring member 40. The finger-like spring members 42 are thereby of such length that they protrude into the path of the annular bead 21 and are spring-stressed when deflected from their normal position by the annular bead 21.

After the engine block 11 is bored out in a single operation as schematically indicated in FIG. 4, the O-ring 60 is then assembled in the rapid coupling arrangement by being placed in the space formed between the bottom surface 16 and bore portion 13 of the engine block 11. Thereafter, the bushing member 30 together with the preassembled washer-type spring member 40 are inserted into the bore portion 31 until the bottom surface 38 of the bushing member 30 rests on the bottom surface 15 of the engine block (FIG. 5). The bushing member 30 together with its preassembled washer-type spring member 40 is then secured held in place by material displacement 18 (FIG. 1), for example, by peening or wedging-over the material by any conventional means such as, for example, an impact tool having an annular V-shaped notching surface (not shown) to form the annular notch 17 in the top of the engine block 11.

As the connecting member 20 is inserted into the coupling arrangement of FIG. 1, the annular bead 21 will cause the finger-like spring members 42 to elastically spread apart by assuming a more vertical position until the annular bead 21 passes the bottom of the finger-like spring members 42, at which time the finger-like spring members 42 will spring back to their original position as shown in FIG. 1 so that the connecting member 20 is now firmly locked in position. The parts are thereby so dimensioned that the finger members 42 will snap back into locking position when the connecting member 20 has reached its desired lowermost position. It should be noted that the present invention provides a rapid coupling arrangement which is extraordinarily simple as regards manufacture and assembly, which avoids any threaded surfaces and utilizes basically only rectilinear bore portions whereby the annular recess 35 can also be realized within the bushing member 30 by extraordinarily simple machining techniques. Furthermore, the connecting member 20 can be readily released and removed from the rapid coupling arrangement in accordance with the present invention by the use of a simple disengaging tool generally designated by reference numeral 50 which includes a cylindrical portion 51 slidable on the outside surface 23 of the connecting member 20. The disengaging tool 50 is also provided with a handle portion 52 of any appropriate configuration, whereby the tubular portion 51 is of such thickness that movement of the disengaging tool 50 in the insertion direction A will cause its lower bevelled surfaces 53 to force the finger-like members 42 apart into a more vertical position, i.e., out of the locking position, thereby releasing the annular bead 21 and permitting withdrawal of the connecting member 20 by movement thereof in a direction opposite the insertion direction A.

It should also be noted that the particular configuration of the various parts shown in FIG. 1 provide a simple sealing arrangement by the use of a single O-ring 60 which effectively seals the space within the part 11 against any fluid leakage through the space between the outer surface 23 of the connecting member 20 and the internal bore surface 14 of the part 11.

Additionally, the method of holding the bushing member 30 securely in position by material displacement as shown in FIG. 1 permits ready disassembly of the bushing member 30 from the part 11 if it becomes desirable or necessary, for example, for interchanging the washer-type spring member 40 and/or the seal 60. For that purpose, it is only necessary to remove the displaced material 18 by conventional machining techniques such as milling or grinding, whereupon the bushing/spring member assembly can be removed again by being lifted out of the bore 12. This will in turn permit exchange of the seal 60 if this should be necessary. The bushing-spring member preassembly, either in its previously used condition or with a new washer-type spring member 40, can then be reassembled after a new washer 60 has been installed whereby the same technique of material displacement described hereinabove can be used again to securely hold the bushing member 30 in position.

FIG. 6 illustrates a modified embodiment which basically differs from the embodiment of FIGS. 1-5 in the internal configuration of the bushing and the manner of fastening the washer-type spring member 40 in position. For that purpose, the bushing 30 is provided with a first bore portion 31' of an internal diameter slightly larger than the external diameter of the rim portion 43 of the washer-type spring member 40. The bore portion 31' thereby has a depth (axial length) greater than the thickness of the rim portion 43 so that a retaining ring 80 can be mounted over the annular rim portion 43. Additionally, for simplification, the second internal bore 32 extends to the bottom surface 37 so that the annular bead 21 is free to move within the space underneath the finger members 42. Preferably, however, the depth of the bottom surface 37 is thereby so chosen that the connecting member 20 comes to rest on the bottom surface 37 after the finger members 40 have sprung back into their locking position in order to avoid any oscillating movement of the connecting member 20. The retaining ring 80 is thereby also secured within the bushing 30 by material displacement 39, e.g., by peening or wedging over material with the use of a conventional tool, for example, by an impact tool having a notched configuration to produce the notch 39'. Removal of the retaining ring can be obtained in the same manner as removal of the bushing out of the part 11. The embodiment of FIG. 6 represents a preferred embodiment because it facilitates manufacture of the bushing and assembly of the washer-type spring member 40 within the bushing 30 as well as movement of the connecting member 20.

The disengaging tool 50 can thereby be slipped over the connecting member 20 when needed or can also be left in place over the connecting member 20 whereby preferably one or more retaining means, for example, one or several detent means of conventional construction are used to hold the disengaging tool 50 securely in place so as to prevent any chattering and/or inadvertent disengagement of the rapid coupling arrangement.

Figure 7:
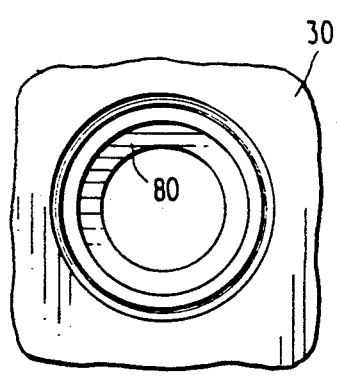
FIGS. 7-9 are top plan views illustrating various ways, in accordance with the present invention, of fastening the retaining ring in the embodiment of FIG. 6 within the bushing by material displacement.
Figure 8:
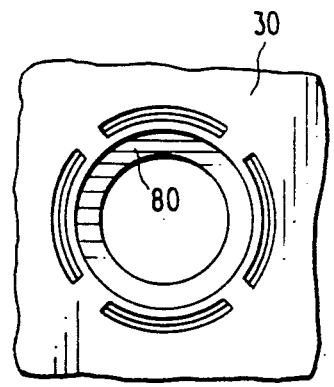
Figure 9:
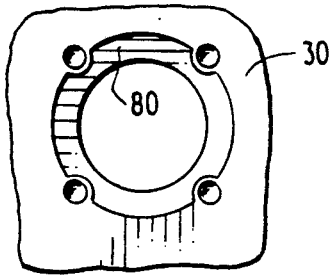

In lieu of the material displacement securing the retaining ring 80 in position by the use of an annular V-shaped notch, as shown in FIG. 7, also a material displacement is possible with the use of a tool having a V-shaped notch only over a part of the circumference, for example, over four arcuately shaped portions formed in a corresponding impact tool (FIG. 8). Additionally, the use of a simple punching tool, for example, a punching prick or a punching tool with four spaced punching pricks can also be used to secure the retaining ring 80 in position by material displacement as shown in FIG. 9. Tests have indicated that any of the retaining arrangements described so far relying on material displacement will hold the retaining ring 80 securely in place even under forces or pressures exceeding 200 bar. Of course, the different material displacement arrangements shown in FIGS. 7, 8 and 9 are equally applicable also to the manner of retention of the bushing 30 within the part 11.

Figure 10:
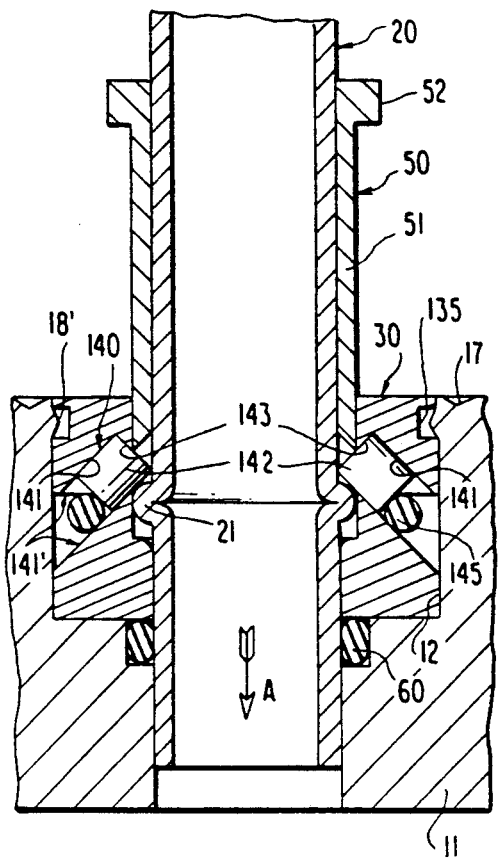
FIG. 10 is a cross-sectional view similar to FIGS. 1 and 6 and illustrating a further modified embodiment of a rapid coupling arrangement in accordance with the present invention.

FIG. 10 illustrates a still further modified embodiment in accordance with the present invention in which, in lieu of a washer-type spring member 40 as shown in FIGS. 1-6, a locking arrangement generally designated by reference numeral 140 is used which utilizes an approach somewhat similar to the locking arrangement as disclosed in FIG. 5 of my aforementioned Swiss Patent 668,630. More specifically, the locking arrangement of FIG. 10, generally designated by reference numeral 140, includes several, for example, three bores 141 extending within the bushing 30 upwardly inwardly in a direction opposite the insertion direction A. A cylindrical locking member 142 is provided in each bore 141 for sliding movement in the inward upward direction under the force of an 0-ring or wire spiral 145. It should be noted thereby that each bore 141 terminates in such a manner as to leave a bottom surface portion 143 determining maximum upward inward movement of the locking member 142. Stated differently, the bores 141 do not with their full diametric dimension extend clear across the entire bushing 30. At the opposite end, the bores 141 terminate in an annular groove 141' to accommodate the member 145. The depth of the bore 141 in relation to the diametric dimension of the locking members 142 is thereby so chosen that the locking members 142 can engage behind the annular bead 21 of the connecting member without interfering with the movement of the connecting member 20. FIG. 10 further illustrates a modification in the arrangement for locking the bushing 30 in position by material displacement utilizing again an impact tool having an annular V-shaped configuration to produce the notch 17. If the bushing is to be of the same axial length as the axial bore portion 12 of the part 11, then the bushing 30 is preferably provided with an annular recess 135 accessible from the outside to permit material displacement 18' into the same. The disadvantage with this arrangement is that it does not lend itself as readily to removal of the bushing as is possible with the material displacement arrangement of FIGS. 1-6. However, it is to be understood that the various material displacement approaches as described herein may be utilized and interchanged in the various embodiments as desired.

Figure 11:
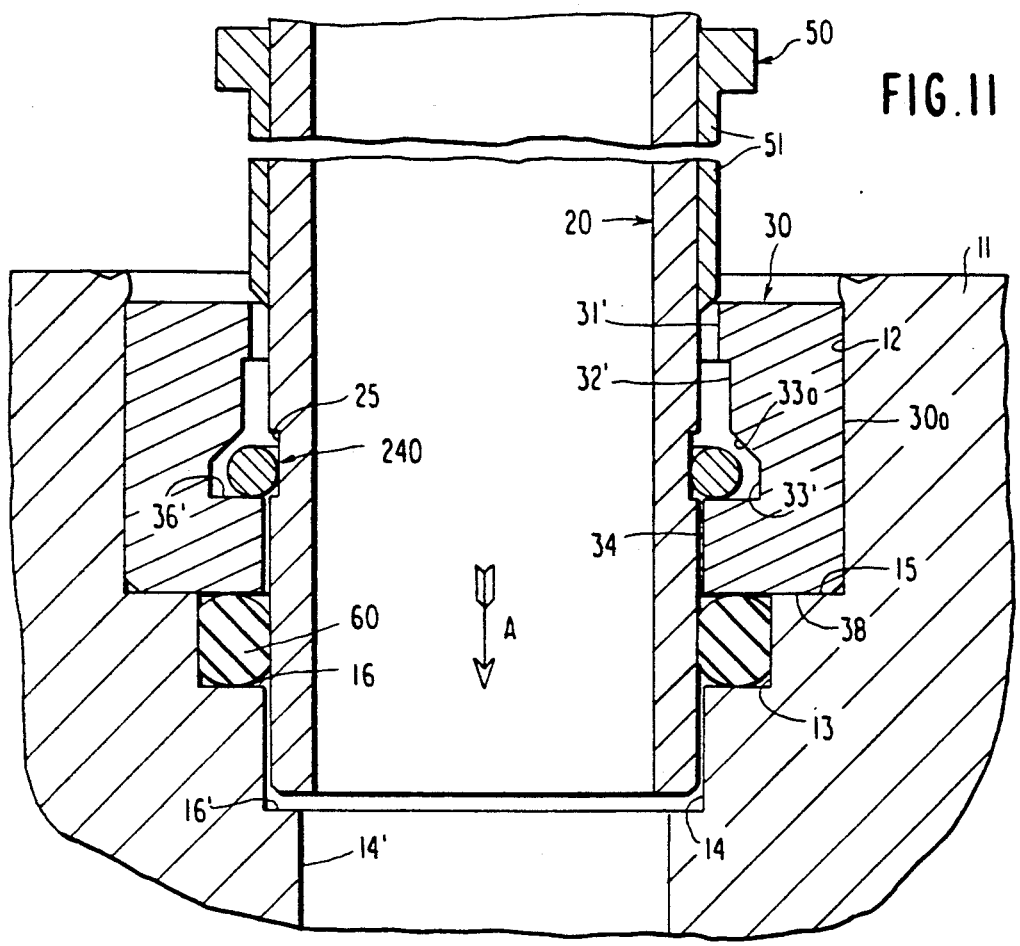
FIG. 11 is a somewhat schematic cross-sectional view through a still further modified embodiment of a rapid coupling arrangement in accordance with the present invention.

FIG. 11 illustrates a further modified embodiment of a rapid coupling arrangement in accordance with the present invention in which the part 11 is again provided with bore portions 12, 13, 14 and additionally with a bore portion 14' whereby steps are formed between the bottom surface 15 and the internal bore portion 13, between the bottom surface 16 and the internal bore portion 14 and between the bottom surface 16' and the internal bore portion 14'. The bushing generally designated by reference numeral 30 includes a cylindrical outer surface 30a slightly shorter in axial length than the bore portion 12 and a bottom surface 38 resting on the bottom surface 15. The internal surfaces of the bushing 30 include a first bore portion 31' adjoined by a second bore portion 32' of larger internal configuration which passes over into a third internal bore portion 33' of still larger internal diametric dimension by way of an inclined surface portion 33a whereby the bore portion 33' terminates in the internal bore portion 34 of smallest diameter. A ring 240 made of spring wire or other appropriate spring material which seeks to contract itself in its diametric dimension, is thereby located on or near the bottom surface 36' of the bushing member 30. The connecting member 20 is provided with an annular recess 25 into which the ring 240 can enter after the connecting member has been inserted in the insertion direction A to its predetermined position. The inclined surface 33a thereby assures a secure locking even if the connecting member 20 attempts to move in the disengaging direction. As to the rest, what was said in connection with the preceding embodiments is equally applicable to the embodiment of FIG. 11, for example, insofar as the fastening of the bushing 30 is concerned.

Figure 12:
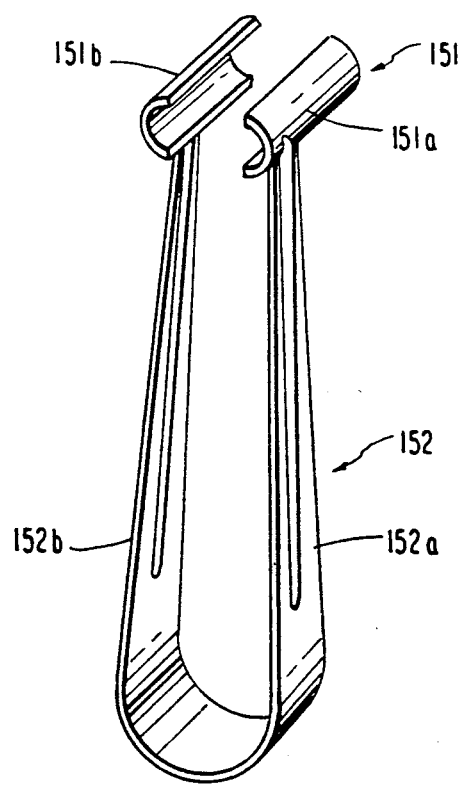
FIG. 12 is a perspective view of a modified disengaging tool for use with the rapid coupling arrangements in accordance with the present invention.

FIG. 12 illustrates a modified disengaging tool generally designated by reference numeral 150 which consists of a split tubular member 151 having semi-circularly shaped tubular parts 151a and 151b that are integral with handle portion 152. The latter can thereby be actuated by manually pressing together the handle parts 152a and 152b so as to reduce the overall diametric dimension formed by the tubular parts 151a and 151b to permit insertion thereof into the space between the connecting member 20 and bushing 30 for purposes of releasing the connecting member by acting on the finger-like spring members 42 or locking members 142 or spring ring 240 of the embodiments illustrated in FIGS. 1 through 6, 10 and 11.

The various embodiments of the rapid coupling arrangement in accordance with the present invention provide a weight-saving arrangement which can be mass-produced by extraordinarily simple means in a very economic manner, particularly, for example, with the use of robots as used in the automotive industry. The assembly of the various parts which can also be disassembled in a simple manner as well as the safe and reliable locking and sealing of the various parts without the use of any complicated machining operations such as would be involved with threaded surfaces represents a significant progress for this type of coupling arrangement.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A rapid coupling arrangement for a relatively fixed part to conduct a fluid from within the part to the outside thereof in reliably sealed relationship, comprising a connecting member, a bushing, and locking means, the relatively fixed part being provided with at least three non-threaded bore portions of decreasing internal diameter in the insertion direction of the connecting member to form a step between the first bore portion of largest diameter and the second bore portion of intermediate diameter and between the second bore portion of intermediate diameter and the third bore portion of smaller diameter, the bushing also having several non-threaded bore portions of different internal diametric dimensions, the connecting member having engaging means enabling engagement with the locking means, the locking means being operable to springily engage the engaging means when the connecting member has reached a predetermined position in the insertion direction within the bushing and the relatively fixed part, seal means in the step formed between the second and third bore portions of the relatively fixed part so as to effectively prevent leakage from within the relatively fixed part through any space present between the outer surface of the connecting member and the third bore portion, and the bushing being securely held in position resting on the step formed between the first and second bore portions of the relatively fixed part by material displacement from the relatively fixed part within the area above the inserted bushing.

2. A rapid coupling arrangement according to claim 1, wherein all bores and openings are non-threaded bores.

3. A coupling arrangement according to claim 1, wherein said coupling arrangement only consists of the relatively fixed part, of the connecting member, of the bushing, of the locking means and of the seal.

4. A coupling arrangement according to claim 1, wherein said locking means is formed by a washer-like spring disk having finger-like members extending obliquely inwardly in the insertion direction, the remaining annular portion of the spring disk being seated in an annular recess formed in the bushing.

5. A coupling arrangement according to claim 1, wherein said locking means include a number of locking members slidably held in bores in said bushing which extend obliquely inwardly in a direction opposite the insertion direction with the locking members being urged obliquely inwardly by spring means so that the locking members can engage the engaging means on the side thereof opposite the insertion direction.

6. A coupling arrangement according to claim 1, wherein said locking means includes a spring ring operable to engage in the engaging means formed by an annular recess in the connecting member.

7. A coupling arrangement according to claim 1, wherein said relatively fixed part is an engine block of an internal combustion engine.

8. A coupling arrangement according to claim 1, further comprising a releasing tool having first means slidably fitting over the outside of the connecting member for engagement with the locking members to disengage the latter from the engaging means, and second means forming a handle means.

9. A coupling arrangement according to claim 8, wherein said first means include two substantially semi-cylindrical spaced parts, said handle means being substantially U-shaped, the two spaced parts being connected with the leg portions of the U-shaped handle means so that the two spaced parts can be formed into an at least approximately cylindrical sleeve by squeezing together the leg portions.

10. A coupling arrangement according to claim 1, wherein said coupling arrangement only consists of the relatively fixed part, of the connecting member, of the bushing means, of the locking means and of the seal means.

11. A coupling arrangement according to claim 1, wherein the seal means is located in an annular groove formed by the step between the second and third bore portions of the relatively fixed part and the bottom of the bushing resting on the second step.

12. A coupling arrangement according to claim 11, wherein said seal means is so confined in said annular groove so as to effectively seal the space within the relatively fixed part against any fluid leakage through the space between the outer surface of the connecting member and the third bore portion.

13. A rapid coupling arrangement for a relatively fixed part, especially for an engine block, to conduct a fluid from within the part to the outside thereof in reliably sealed relationship, comprising a tubular connecting member, bushing means and locking means, the relatively fixed part being is provided with at least three non-threaded bore portions of decreasing internal diameter in the insertion direction of the connecting member to form a step between the first bore portion of largest diameter and the second bore portion of intermediate diameter and between the second bore portion of intermediate diameter and the third bore portion of smaller diameter, said bushing means having at least three non-threaded bore portions including a first bushing bore portion of larger internal diameter followed in the insertion direction by a second bushing bore portion of smaller internal diameter, the connecting member having an annular bead with a maximum outer diameter at most approximately equal to the internal diameter of the second bushing bore portion and so located along its axial length that it lies at least partially within the area of the second bushing bore portion when the locking means has become effective by engaging the side of the annular bead opposite the insertion direction, the locking means including spring-loaded members extending obliquely toward the axis of the coupling arrangement, seal means in the step formed between the second and third bore portions of the relatively fixed part so as to effectively prevent leakage from within the relatively fixed part through any space between the outer surface of the connecting member and the third bore portion of the relatively fixed part, said bushing means being securely held in position resting on the step formed between the first and second bore portions of the relatively fixed part by cold deformation of the relatively fixed part within the area above the inserted bushing means to provide material displacement, and said locking means being accommodated within said bushing means and being urged into locking position by spring action.

14. A rapid coupling arrangement according to claim 13, wherein all bores and openings are non-threaded bores.

15. A coupling arrangement according to claim 13, wherein said locking means is formed by a washer-like spring disk having finger-like members extending obliquely inwardly in the insertion direction, the remaining annular portion of the spring disk being connected to said bushing means.

16. A coupling arrangement according to claim 14, wherein said washer-like spring disk is seated with its annular rim in an annular recess formed in said bushing means.

17. A coupling arrangement according to claim 15, wherein said washer-like spring disk is seated on a step between two bore portions of said bushing mean, and a retaining disk retaining the washer-like spring disk on said last-mentioned step, said retaining disk being secured in said bushing means by material displacement of the bushing means over the surface of the retaining ring opposite the surface thereof resting on the washer-like spring disk.

18. A coupling arrangement according to claim 13, wherein said locking means includes a number of locking members slidably held in bores in said bushing means which extend obliquely inwardly in a direction opposite the insertion direction, the locking members being urged obliquely inwardly toward the axis of the coupling arrangement by spring means so that the locking members can engage behind the side of the annular bead opposite the insertion direction.

19. A coupling arrangement according to claim 13, further comprising a releasing tool having first means slidably fitting over the outside of the connecting member for engagement with the locking members to disengage the latter from the engagement enabling means, and second means forming a handle means.

20. A coupling arrangement according to claim 19, wherein said first means include two substantially semi-cylindrical spaced parts, said handle means being substantially U-shaped, the two spaced parts being connected with the leg portions of the U-shaped handle means so that the two spaced parts can be formed into an at least approximately cylindrical sleeve by squeezing together the leg portions.

21. A rapid coupling arrangement for a relatively fixed part to conduct a fluid from within the part to the outside thereof in reliably sealed relationship, comprising a connecting member, a bushing, and locking means, the relatively fixed part being provided with at least three non-threaded bore portions of decreasing internal diameter in the insertion direction of the connecting member to form a step between the first bore portion of largest diameter and the second bore portion of intermediate diameter and between the second bore portion of intermediate diameter and the third bore portion of smaller diameter, the bushing also having several non-threaded bore portions of different internal diametric dimensions, the connecting member having means enabling engagement with the locking means including an annular bead with maximum outer diameter at most approximately equal to the internal diameter of one of the bushing bore portions, the locking means being operable to springily engage the engagement enabling means when the connecting member has reached a predetermined position in the insertion direction within the bushing and the relatively fixed part, seal means in the step formed between the second and third bore portions of the relatively fixed part so as to effectively prevent leakage from within the relatively fixed part through any space present between the outer surface of the connecting member and the third bore portion, and the bushing being securely held in position resting on the step formed between the first and second bore portions of the relatively fixed part by material displacement from the relatively fixed part within the area above the inserted bushing.

* * * * *